May 10, 1966   W. G. REICHE   3,250,950
MEANS FOR INDICATING THE CONDITION OF LAMPS IN A VEHICLE
Filed June 13, 1963   4 Sheets-Sheet 1

INVENTOR.
WALTER G. REICHE
BY
OSTROLENK, FABER, GERB & SOFFEN
ATTORNEYS

United States Patent Office 3,250,950
Patented May 10, 1966

3,250,950
MEANS FOR INDICATING THE CONDITION OF LAMPS IN A VEHICLE
Walter George Reiche, 1541 E. 4th St., Brooklyn, N.Y.
Filed June 13, 1963, Ser. No. 287,687
9 Claims. (Cl. 315—77)

This invention relates to automotive systems and more particularly to a novel arrangement for automatically and instantaneously indicating the condition of all lights in the electrical system of automobiles, trucks and the like.

In order to examine the lights in the electrical system of an automobile, trucks and so forth, it normally is necessary that the lights be switched into the on state and that the driver leave the cab or seat of the automobile or truck and observe the indication of the lights from the exterior of the truck or car. Thus, examination of the state of the automotive lighting system requires either the driver leaving the seat of the automobile in order to examine the lighting system, or requires a second individual who observes the condition of the lights in the automotive system from the exterior as the driver operates the lights in the automobile. For example, in checking the stop lights of an automobile or truck, it is necessary that the driver or some other person depress the brake of the automobile and simultaneously therewith a second person observe the condition of the stop or brake lights of the automobile during the time in which the person is depressing the brake pedal. The instant invention completely eliminates the need for providing either a second observer or for the driver removing himself from the seat of the automobile in order to ascertain the condition of the automobile lighting system. The device of the instant invention also provides such indications automatically and instantaneously whenever such information is desired or whenever the lights are turned on.

The device of the instant invention is comprised of a novel relay arrangement, comprised of a plurality of windings positioned about a magnetic member. Selected ones of said windings are connected to various portions of the automobile lighting system such as, for example, the stop lights, park lights, low beam head lamps, high beam head lamps and so forth. A balance winding is also provided, which winding is in the energized state whenever the lighting system is in use regardless of the particular combination of lights which may be energized at any given instant. The circuitry is so arranged that the lighting system when in proper working condition energizes its associated windings so as to counter-balance any effect of the balance winding means.

If, however, any of the bulbs in the automobile lighting system become defective or fail, this causes a sharp change in the current derived from that particular portion of the lighting system so as to affect the balance of the windings provided in the relay means. This unbalanced condition acts to actuate the associated relay windings in such a way so as to provide either audible or visual indication, or both, of a faulty condition in the lighting system. Further, indicating means are provided during normal operation so as to indicate a normal condition of the lighting system to further insure the user of safe operation thereof.

Further means are provided for the checking of the automotive system stop lights each time the automobile brakes are employed so as to ascertain the condition of the lights in the stop light portion of the lighting system. This operation may be performed either while operating the automobile or prior to operation thereof since its final result is identical in either of the two situations. This is likewise true of the observation of the rest of the automobile lighting system so that no requirement is imposed upon the user thereof to observe this light condition indicating means while the car is in motion, but the test may be performed equally as well with the automobile in a stand still position.

An extremely advantageous feature derived from the arrangement of the instant invention is such that the counterbalancing effect completely obliviates all of the problems involved in a fluctuating voltage system. For example, most automotive electrical systems are designed for 12 to 15 volt operation. However, this voltage level may fluctuate widely from the norm and thereby affect the current being supplied to the automotive lighting system. This in turn affects the currents introduced into the windings of the relay means thus significantly altering the ampere turns generated by these windings. However, since the input windings and counterbalance winding are all affected in the same manner, the overall result is such that any change in the voltage level of the input to the electrical system does not affect the operation of the light condition indicating means.

It is therefore one object of the instant invention to provide novel light condition indicating means for automobiles, trucks and the like which is designed to provide an automatic indication of the condition of the automotive lighting system without the necessity of actual physical observation of said lighting system.

Another object of the instant invention is to provide a novel light condition indicating means for use in automobiles, trucks and the like, having a novel relay arrangement using windings in a counter-balancing configuration.

Still another object of the instant invention is to provide a novel light condition indicating means for use in automobiles, trucks and the like, having a novel relay means employing counter-balancing windings to completely alleviate the effect of any voltage input fluctuation to the automobile electrical system.

Still another object of the instant invention is to provide a light condition indicating means for use in automobiles, trucks and the like which has a novel arrangement for providing both normal and alarm indications to apprise the user of the condition of the automotive lighting system.

These and other objects will become apparent when reading the accompanying description and drawings in which.

Figures 1, 2, 3:
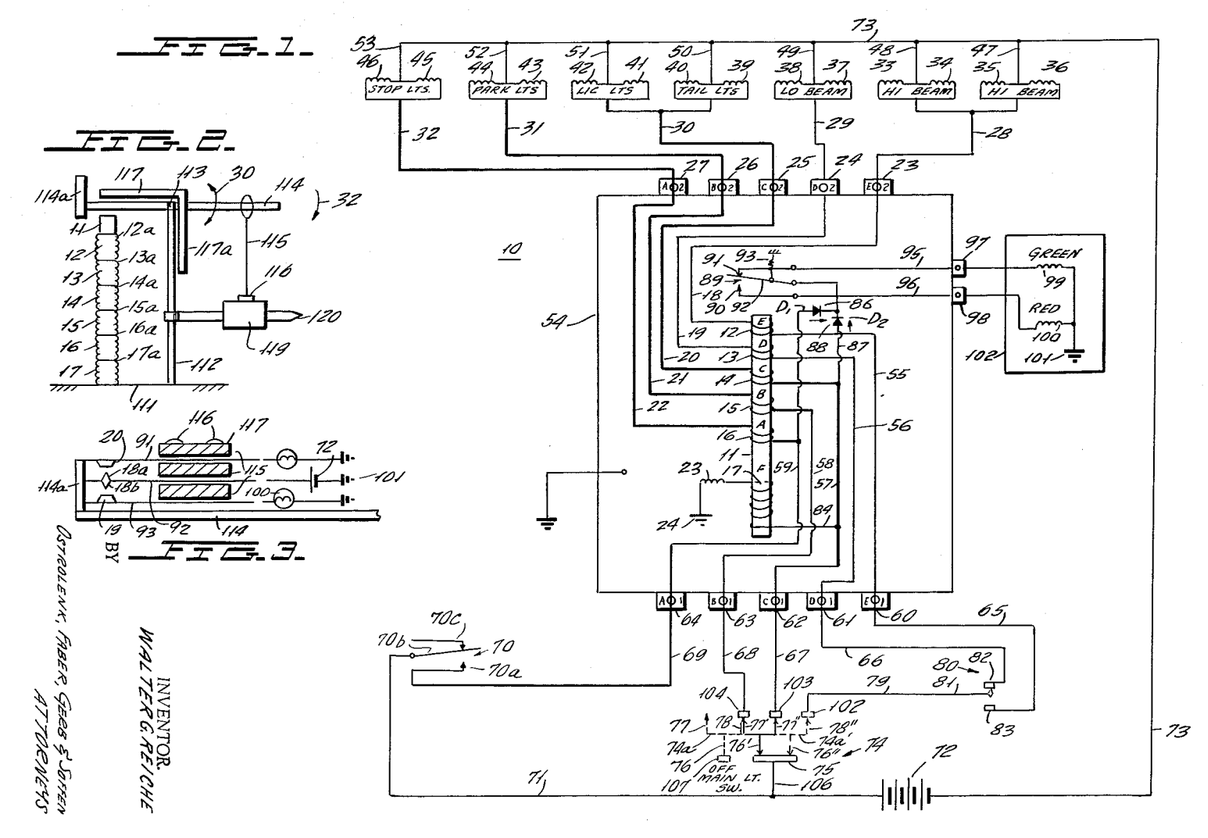
FIGURE 1 is a schematic diagram of a light condition indicating means designed in accordance with the principles of the instant invention.
FIGURE 2 shows a typical armature structure which may be employed in the arrangement of FIGURE 1.
FIGURE 3 shows the constant structure and armature of FIGURE 2 in greater detail.

Referring now to the drawings, FIGURE 1 shows an automobile light condition indicating means 10 comprised of a magnetic member 11 having a plurality of windings 12–17 respectively, which windings are positioned so as to have a magnetic member 11 threaded therethrough. Winding 12 is connected through a conductor 18 to a terminal 23 for connection therethrough to the particular lights of the automotive electrical system. The other windings 13–16 are connected through conductors 19–22 respectively to the terminals 24–27 respectively which are suitable in a like manner for connection to the remaining lamps provided in the automotive electrical system.

The opposite terminals of windings 12–16 are connected through conductors 55–59 respectively to the terminals 60–64 respectively. These terminals provide means for ready connection of the windings 12–16 to the other necessary elements of the electrical system for providing both appropriate energization of the light condition indicating system 10, as well as providing the necessary functions which the light condition indicating system 10 performs. Thus the light condition indicating means 10 is provided in a modular or unitary form 54 so as to be readily connectable to the automotive lighting system with a high degree of ease. The connections are made simply by suitably connecting the terminals 23–27 and 60–64 to the appropriate conductors of the automotive lighting system.

Each of the terminals 23–27 respectively, are connected through conductors 28–32 respectively, to the lights of the automotive lighting system. Conductor 28 branches into first and second paths, the first path of which contains bulbs 35 and 36 in parallel, which bulbs when lit constitute the high beam condition of the front head lamps. The opposite terminals of these bulbs are connected through conductor 47 to main bus 73. Main bus 73 is connected to the negative side of the voltage source 72. The second path into which conductor 28 splits is comprised of the parallel connected lamps 33 and 34 which are the high beam lamps of the second head lamp. Parallel path 33–34 terminates in conductor 48 at its opposite terminals which in turn is connected to bus 73. Conductor 29 is connected to the parallel lamps 37 and 38 which are the low beam head lamps. The opposite terminal 49 of this parallel connection is connected to bus 73. Conductor 30 splits into first and second branch paths, the first of which contains the parallel connected lamps 39 and 40 which are the tail light lamps for the automotive system. The opposite terminals of this parallel connection runs through lead 50 to bus 73. The second branch path contains the lamps 41 and 42 which are the license plate lamps of the electrical system. The opposite terminal of the parallel connections runs through lead 51 to bus 73. Conductor 31 is connected to the parallel arranged lamps 43 and 44 which are the parking lights of the automotive system. The opposite terminal of the parallel connected lamps runs through lead 52 to bus 73. Conductor 32 is connected to the parallel arranged lamps 45 and 46 which are the stop lights of the automotive system. Opposite terminal of the parallel connection runs through 53 to bus 73.

As for the terminals 60–64, located at the opposite end of the module 54, and terminal 60 is connected through lead 65 to one stationary contact 83 of the dimmer switch 80 in the automotive system. As is well understood, a dimmer switch is provided in automobiles in order to select between the high and low beam conditions of the automotive system head lamps. The other stationary contact 82 of dimmer switch 80 is connected through conductor 66 to terminal 61. Terminal 62 is connected through bus 67 to one stationary contact 103 of the main light switch 74 provided in the automobile. Typical light switches for automobiles are provided with three positions. Mainly the off positions, the parking lights position and the head lamps position. In the off position, none of the lights in the automotive system are operative with the exception of the stop lights which are controlled exclusively by the application of the brakes. In the parking lights position the parking, license lights and tail lights of the automobile are placed in the energized position. In the head lamp position the parking lights, license lights and either low or high beam state of the head lamp are placed in the energized position. The main light switch is comprised of a first elongated stationary contact 75 connected through lead 106 to the positive side of the voltage source 72. A movable member 47a operative by the manual manipulation of the light switch is provided with three contacts, 76, 77 and 78 respectively. Contact 76 is positioned to slidably engage the elongated contact 75. Contact 77 is provided to engage either of the stationary contacts 104 or 103, depending upon the light switch position. Contact 78 is provided to engage any of the contacts 104, 103 or 102, providing again upon the position of the main light switch. For example, in the off position, contact 76 engages an off contact member 107. As can be seen, the contact 107 is completely isolated from the voltage source 72 so that no energy is fed to this system even though contact 78 engages the stationary contact 104. When the main light switch is moved to the parking light position, contact 76 is now placed in the position represented by numeral 76' and engages the stationary member 75. Contact 77 now in the position shown by numeral 77' engages stationary contact 104 and contact 78 now in the position designated by numeral 78' engages stationary contact 103. In this position a first current path is established from the D.C. source 72 through conductor 106, stationary contact 75, contact 76', contact 77', stationary contact 104, conductor 68, terminal 63, conductor 58, winding 15, conductor 21, terminal 26 and conductor 31 to park lamps 43 and 44. The opposite terminals of park lamps 43 and 44 are returned through conductor 52 and bus 73 to the negative side of the voltage source 72. The second current path extends through conductor 106, contact 75, contact 76', 78', stationary contact 103, conductor 67, terminal 62, conductor 57, winding 14, conductor 20, terminal 25, conductor 30, through to the license lamps 41 and 42 and the tail lamps 39 and 40, the opposite ends of which run through leads 50 and 51 to the bus 73. Thus, in this position, the parking lamps, license lamps and tail lamps are all energized.

It should be noted that the terminal 62 also establishes a current path through lead 84 to winding 17, the opposite terminal of which is connected through lamp 23 to ground potential 24 thus energizing a balance winding 17 when the main light switch is placed in the parking light position. This condition would therefore have windings 17, 14 and 15 all in the energized state. Coils 14 and 15 are so wound relative to coil 17 so as to set up a magnetic field pattern which is in a direction opposite to that of the magnetic field pattern generated by coil 17 so as to exactly balance up and provide a net magnetic field of zero magnitude. It should be noted that while the park lamps, license lamps and tail lamps 44–43, 42–41 and 40–39 respectively, draw slightly different currents, the number of turns of windings 14, 15 and 17 are selected in such a way that the total number of ampere turns of windings 14 and 15 are equal to the total ampere turns of winding 17 so as to provide the balancing effect. Thus, in this condition, with a net magnetic field of zero magnitude the magnetic member 11 fails to exert any pull upon the movable contact 92 magnetically associated therewith. Movable contact 92 comprises one member of the contact structure 89 which is further comprised of stationary contact members 90 and 91. Stationary contact 90 is connected through lead 96 and terminal 98 to a bulb 100, the opposite end of which is connected to ground potential 101. Stationary contact 91 is connected through lead 95 and terminal 97 to a second bulb 99, the opposite end of which is connected to ground potential 101. Movable contact 92 is normally biassed into the position as shown in FIGURE 1 by means of a spring member 93 connected at one end to movable contact 92 and at its opposite end to a stationary or reference point 94. Remembering that the result in magnetic field generated by the magnetic member 11 is zero, movable contact 92 is biassed into the position as shown in FIGURE 1. This establishes a current path through energy source 72, conductor 106, contact 75, movable contact 76', movable contact 78', stationary contact 103, lead 67, terminal 62, conductor 57, conductor 87, semi-conductor 88, movable contact 92, stationary contact 91, conductor 95, terminal 97 and bulb 99 to ground potential 101. Bulb 99 is selected to be a green bulb so as to identify the fact that all of the lights energized in the parking light position of the main switch 74 are in the operative position.

Let it be assumed that lamp 41 of the license lamps 41 and 42 has burned out. This means that the current fed to this parallel arrangement is diminished thereby diminishing the amount of current through conductor 30, conductor 20 and winding 14. In this situation the resultant magnetic field generated by windings 14 and 15 is smaller in magnitude than the magnetic field generated by winding 17 so as to produce a resultant magnetic field of a value different from zero. This causes magnetic member 11 to exert a pull-upon movable contact 92 with the pole being sufficient to draw movable contact 92 against the force of spring member 93 and such that movable contact 92 engages stationary contact 90. In this position, the current path through diode or semi-conductor 78 extends through movable contact 92, stationary contact 90, conductor 96, terminal 98 and bulb 100 to ground potential 101. Lamp 100 is chosen to be a red lamp which indicates that one of the lamps of the parking lamps, license lamps and tail lamps group has burned out or failed.

Moving the main light switch 74 to the head lamp position, this establishes a current path from voltage source 72 through conductor 106, stationary contact 75, movable contact 76, which is now in the position shown by numeral 76′, movable contact 77″, stationary contact 103, conductor 67 and 57 to winding 14 which is connected to tht license lamp 41, 42 and tail lamps 39–41. A second current path establishes leads from stationary contact 75, movable contact 76″, movable contact 78″, stationary contact 102, and conductor 79 to movable contact 81 of the dimmer switch arrangement 80. Let it be assumed that the dimmer switch is operated so that movable contact 81 is in the position shown in FIGURE 1. The current path then extends through conductor 66 and 56 to winding 13 which extends through conductor 19 to the low beam head lamps 37 and 38. Thus in a head lamp position, the license lamps, tail lamps and low beam head lamps are all in the energized condition. The coils now energized are coils 13 and 14 together with the balancing coil 17 which is connected through conductor 67, stationary contact 103, movable contact 77′, movable contact 76′, stationary contact 75 and conductor 106 to the voltage source 72. The ampere turns generated by the windings 13 and 14 is such as to exactly counter balance the ampere turns generated by winding 17 to provide a net magnetic field of zero. This permits the movable contact 92 of the contact structure 89 to be retained in the position as shown in FIGURE 1 thus keeping the green lamp 99 energized in the same manner as previous described. By operating the dimmer switch 80 in the appropriate manner to select the high beam condition, movable contact 81 is brought into engagement with stationary contact 83 and disengagement from stationary contact 82 so as to establish a current path through conductors 65 and 55 to winding 12 which extends through conductors 18 and 28 to the high beam lamps 35–36 and 33–34. The path to winding 13 being broken, this winding moves to the de-energized condition. In the same manner as previously described, the number of windings of coil 12 is selected so that the ampere turns of winding 12 are coupled with the ampere turns of winding 14 such as to exactly counter balance the ampere turns of winding 17 to provide a net magnetic field of zero. This thereby enables movable contact 92 to be retained in the position as shown in FIGURE 1 to keep the green lamp light. If any of the lamps 33–36 and/or 39–42 burn out, this immediately sets up an unbalanced situation causing movable contact 92 to be drawn downward so as to energize the red lamp 100, in the same manner as previously described.

In order to test the lamps of the automotive stop light system, the brake pedal is depressed so as to operate the brake switch 70. Brake switch 70 is comprised of stationary contacts 70a and 70c and movable contact 70b which is connected through conductor 71 to the positive side of voltage source 72. When the brake pedal is not depressed, brake switch 70 has its movable contact 70b in a position as shown in FIGURE 1. When the brake pedal is depressed, movable contact 70b is automatically disengaged from contact 70c and brought into engagement with stationary contact 70a. This establishes a current path from voltage source 72 through conductor 71, brake switch 70, conductor 69, terminal 64, conductor 59, winding 16, conductor 22, terminal 27, conductor 32, the parallel stop lamps 45–46 and conductor 53 to the negative of 73. Let it be also assumed that the main light switch 74 is in the off position such that no other lamps are being energized at this time. Thus, the only coil which is energized at this time is coil 16. However, it should be noted that conductor 59 connects coil 16 through to the positive side of voltage source 72 and is further connected through winding 85 and semiconductor 86 to movable contact 92. Thus, with no other windings except for winding 16 being energized a net magnetic field of a value other than zero is generated causing the movable contact 92 to be drawn into engagement with stationary contact 90. Current path is then continued through movable contact 92, stationary contact 90, conductor 96 and terminal 98 to red lamp 100. Thus, with the stop lamps 45 and 46 in the correct operating condition, red lamp 100 becomes energized. In this condition it should be noted that energization of red lamp 100 indicates correct operation of lamps 45 and 46. Let it be assumed now that one of the lamps 45 or 46 is burned out. This causes less current to be fed to the remaining lamp through conductor 32 thus affecting the current to be fed to the winding 16. As a result, the ampere turns generated by this winding is then insufficient to draw the movable contact 92 out of engagement with stationary contact 91. In this condition, the current path extends through semi-conductor 86, movable contact 92, stationary contact 91 and conductor 95 to the green lamp 99 which is then indicative of a burnout of either one or both of the stop light lamps 45 and 46. Semi-conductor 88 is so polarized that the current path through semi-conductor 86 is prevented from passing through semi-conductor 88 due to the reverse polarity thereof so that winding 14 does not become energized at the time when the stop lights 45 and 46 are being checked for correct operation thereof. In a like manner, when main light switch 74 is in a position so as to energize conductor 57 and winding 14, no current path is established through semi-conductor 88 and semi-conductor 86 due to the reverse polarity connections, so as to prevent energization of winding 16.

Let it be assumed that it is desired to test the stop lamps with the main light switch in the parking light position 74a′. In this position, windings 15 and 14 are energized in the same manner as previously described, together with the balance winding 17, plus setting up a result in magnetic field of zero magnitude. When the brake pedal is depressed winding 16 further becomes energized to upset the balanced condition causing movable contact 92 to be drawn downward and into engagement with stationary contact 90 to energize the record lamp 100. Thus the momentary depression of the brake pedal energizes the red lamp 100 which indicates the successful operating condition of the stop lamps 45 and 46. If either one or both of these stop lamps 45 and 46 are burned out, winding 16 generates a magnetic field of substantially less magnitude so that even though the resultant magnetic field is different from zero it is nevertheless small enough in magnitude so as to be prevented from overcoming the force of spring member 93 thereby retaining movable contact 92 and engagement with stationary contact 91. This retains the green bulb 99 in the energized condition. Thus with the main light switch in the parking light position and with the brake pedal depressed if the green lamp remains energized when the brake pedal is in the depressed position, this indicates a burn out of either one or both of the stop lamps 45 and 46. The operation is substantially the same when the main light switch is moved into the head light position so as to energize either the high or low beams. A description of this operation will be omitted for purposes of clarity.

Figures 4, 6:
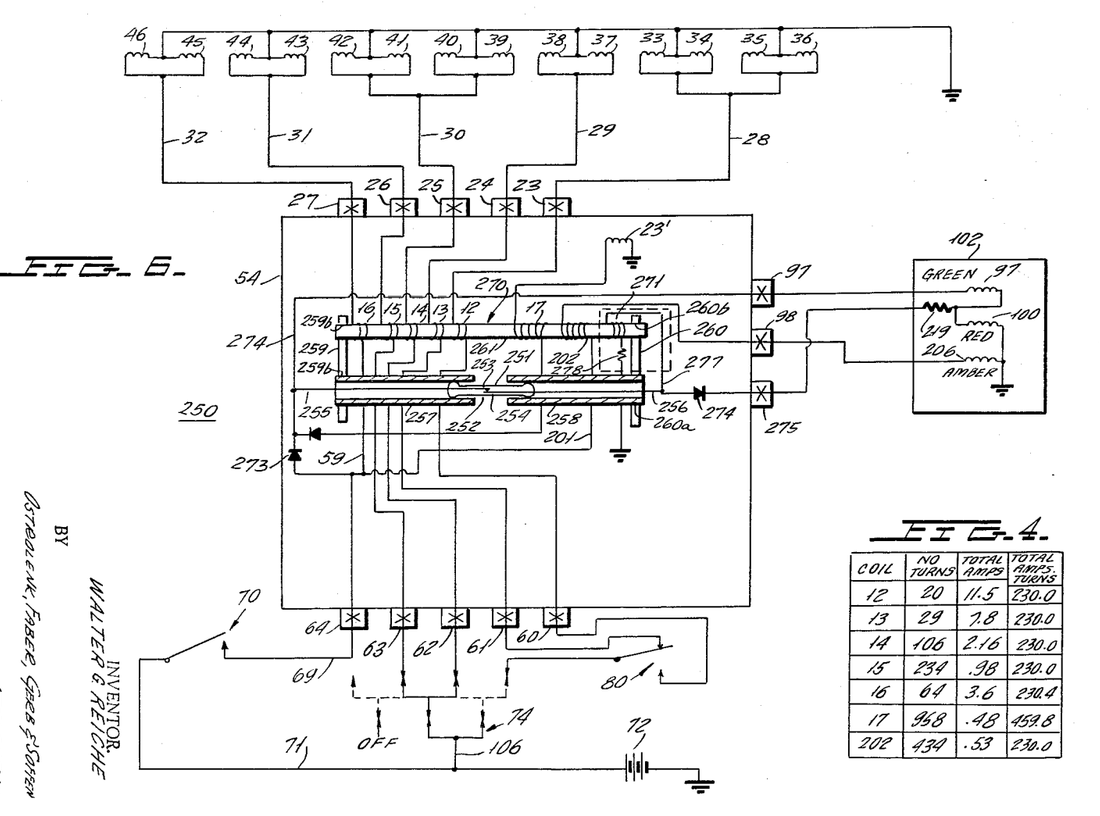

FIGURE 4 is a chart showing the coils 12–17 and the number of turns, amperage and total ampere turns generated by each. For example, consider the main light switch as being in the parking light position. In this position windings 14, 15 and 17 are in the energized condition. Winding 14 is provided with 106 turns. The total number of amperes drawn by the license lamps and tail lamps 41–42 and 39–40 respectively is 2.6 amps. This provides a total number of ampere turns of 230 ampere turns. Parking lamps 43 and 44 draw a total current of .98 ampere; winding 15 which has 240 turns thereby provides a total magnetic field of 230 ampere turns. The total number of ampere turns thereby generated by coils 14 and 15 is 460 ampere turns.

Bulb 23 connected in series with winding 17 draws a current of 0.48 ampere and is provided with 958 turns so as to generate a magnetic force of approximately 460 ampere turns, thereby generating a resultant magnetic field of zero magnitude. Considering the remainder of the chart, it can be seen that this balanced condition exists throughout regardless of the position of the main light switch 74.

Turning now to FIGURE 2, one physical arrangement for the magnetic member 11, windings 12–17 and switch arrangement 89 is shown therein. The magnetic member 11 is affixed at a first end thereof to a base member 111 of a magnetic material. The windings 12–17 are wound about separate bobbins 12a–17a respectively, which are all positioned so as to have magnetic member 11 threaded therethrough. The base member 111 is formed of a magnetic material and further has connected thereto a first arm 112 which is also formed of a magnetic material. A balance arm 114 is positioned atop the upper end 113 of arm 112 (see also FIGURE 3). The right hand end of arm 114 is connected through a wire 115 to the armature 116 of a relay 119. The left hand end of arm 114 is provided with a flanged portion 114a which is connected to movable contact 92 at one end thereof. The movable contact 92 and stationary contacts 90 and 91 are supported and insulated from one another by insulating members 115 which are secured by suitable fastening means 116 to an L-shaped bracket 117 secured at one end thereof 117a to first arm 112. A solenoid 119 is provided with suitable lead 120 which are connected to the D.-C. voltage source 72 for energization thereof. Solenoid 119 is provided with a winding so as to generate ampere turns of an amount substantially sufficient to counter balance the ampere turns of the windings 12–17 which are selectively energized in accordance with the position of the main light switch 74. When a balance condition exists magnetic member 11 fails to generate any magnetic field so that the solenoid 119 is able to urge arm 114 in the clockwise direction about pivot 113. This causes the left-hand end of arm 114 to move substantially in an upward direction so as to bring movable contact 92 into engagement with stationary contact 91 to establish a current path through to the green lamp 99 (see FIGURE 1) in the same manner as previously described. When an unbalanced condition exists, magnetic member 11 exerts a magnetic pull on the balance arm 114 causing it to be rotated counterclockwise about its pivot point 113 so as to bring movable contact 92 into engagement with stationary contact 90 so as to establish a current path through a red lamp 100. It has been found that solenoid 119 operates as well as the spring member 93 in the embodiment of FIGURE 1 and either of these two biasing means may be employed depending only upon the need of the user.

It can therefore be seen that the instant invention provides a novel light condition indicating means for automotive and truck systems and the like which may be very readily installed into an automotive system so as to positively automatically and instantaneously indicate by visual means the condition of the lights in the automotive electrical system. The panel 102 containing the indicating lamps or bulbs 99 and 100 may be mounted to any suitable position on the dash board while the modular unit 54 may be mounted beneath the hood of the automobile or truck so as to be mounted substantially close to the lighting system, while at the same time avoiding the necessity for mounting this modular unit in the cabin or seating area of the automobile. The modular units 54 may, however, if desired, be mounted beneath the dashboard if a suitable position can be found therefore and its actual mounting position depends only upon the needs and desires of the user. The actual connection of the modular units 54 and 102 may be easily and swiftly carried out simply by connecting the terminals 23–27 and 60–64 to the appropriate leads of the automobile electrical system.

Since the voltage level of the voltage source 72 while normally at the 12 volt level in 12 volt systems, for example, may fluctuate widely so as to actually operate between the limits of 14 volts and 10 volts for example, this will affect the amount of current introduced into the windings 12–17. It should be noted, however, that the diminished amount of current fed to the windings 12–15 will be compensated for by the diminished amount of current fed to the balanced winding 17 so that the result and effect will be inconsequential so far as the magnetic member 11 is concerned since the result in field will remain the same regardless of the voltage level of the source 72. Thus, in spite of a wide fluctuations of the voltage source 72, this in no way will affect the operation of the light condition indicating means 10.

Figures 5, 5A:
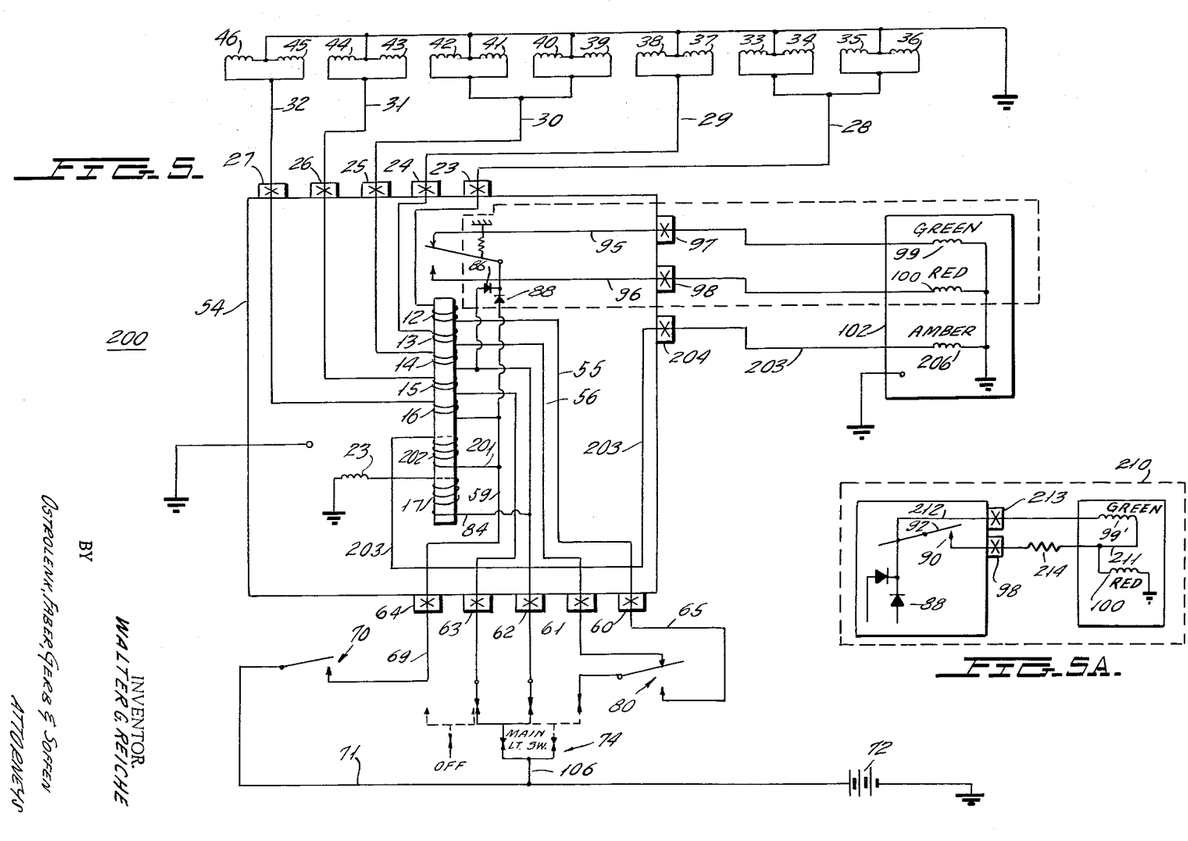

FIGURE 5 shows another preferred embodiment 200 for performing the functions of the embodiment 10 of FIGURE 1. In the arrangement 200 of FIGURE 5, like elements are designated by like numerals, however, the structure has been altered for the purpose of performing the operation of checking the stop lights in the following manner:

The brake switch 70 which is connected through lead 69 and terminal 64 and conductor 59 to winding 16, the other end of which is connected to the stop lights 45 and 46, also is connected through a lead 201 to winding 202, the opposite end of which is connected through a conductor 203 to an output terminal 204 of the module 54. Output terminal 204 is in turn connected through lead 205 to an amber bulb 206 provided in module 102. Thus, by depressing the brake pedal (not shown) this closes brake switch 70, establishing a current path from voltage source 72 through coil 202, lead 203 and 205 to amber bulb 206. Thus, each time the brake pedal is depressed, amber bulb 206 becomes energized to apprise the operator of this condition. In addition thereto, amber bulb 206 serves the further purpose of indicating when the brake switch 70 becomes or may become "stuck." Thus, if the operator releases his foot from the brake pedal and the amber light remains energized, this indicates that the brake switch 70 has failed to return to its normal open state and some adjustment of the brake switch is therefore required. The windings 202 and 16 which become energized upon closure of brake switch 70 are wound in reverse directions, so that the winding 202 acts as a balancing winding relative to winding 16. Thus in a normal condition, that is, when both stop lights 45 and 46 are in their proper working order, winding 16 and 202 generate a resultant magnetic field of zero, so as to retain movable contact 92 in engagement with stationary contact 90 (in a reverse position from that shown in FIGURE 5) so as to cause green bulb 99 to remain energized. In the case where either one of the stop lights, or both of the stop lights, 45 or 46 become defective, winding 16 draws less current so that the windings 16 and 202 generate a resultant magnetic field of greater than zero, causing the movable contact 92 to move into engagement with stationary contact 91, so as to energize red bulb 100. Diode 88 provides the current through conductor 59 to the bulb so as to energize the appropriate bulb. Diode 86 acts to prevent any current from being fed into winding 14 in the same manner as previously described. Thus, the operation of the embodiment 200 of FIGURE 5 is substantially the same as that of FIGURE 1, with the exception that the amber bulb 206 provides indication of the fact that the brake switch has moved to the closed position and that the bulbs 99 and 100 do not reverse their functions as was the case with the embodiment of FIGURE 1.

FIGURE 5a shows a module 210 which may be substituted for either of the modules 102 of FIGURES 1 and 5. In the module 210, the green bulb 99' is series connected through a conductor 211 to red bulb 100' which is in turn connected to ground. In the case where the bulbs of the automobile lighting system are all operating properly, the movable contact 92, shown in FIGURE 5a, is out of engagement with the stationary contact 90. However, a current path is established through diode 88, conductor 212, terminal 213 and green bulb 99' through red bulb 100' to ground potential. The red bulb is a 2.5 volt bulb, while the green bulb is a 12 volt bulb, such as to cause the green bulb to become energized while the red bulb will not glow.

If one of the bulbs of the electrical lighting system fails, this causes an unbalance in the magnetic member 11 (see FIGURES 1 or 5) causing the movable contact 92 to come into engagement with stationary contact 90. The current path is now established through diode 88, movable contact 92, stationary contact 90, terminal 98, through a resistive member 214 and red bulb 100' to ground potential. This operation acts to short out the green bulb and the red bulb becomes energized. The module 210 of FIGURE 5a performs the same function as the modules 102 of FIGURES 1 and 5 while omitting the need for one extra contact.

FIGURE 6 shows still another embodiment 250 for the light condition indicating means which employs a reed element 251. The reed element 251 is comprised of a glass envelope 252 housing first and second cooperating contacts 253 and 254 which are normally in the disengaged state, as shown in FIGURE 6. The two reed contacts distend at their opposite ends through the glass envelope 252 and through leads 255 and 256 respectively, into the circuit of the light alarm means 250. In FIGURES 1–6 like numerals designate like elements. The reed member 251 is housed in first and second tubular magnetic members 257 and 258, which are secured at their opposite ends in apertures 259a and 260a provided in flat magnetic pieces 259 and 260 respectively. Pieces 259 and 260 are provided with second apertures 259b and 260b respectively, for housing a cylindrically shaped magnetic bar 261, upon which the windings 12–17, 202 and 271 are mounted. The assembly 270 is comprised of the hollow magnetic members 257, 258, plates 259 and 260 and rod 261 form a magnet employed to operate the reed means 251. The reed 251 operates in such a manner as to cause the contacts 253 to 254 to come into as close alignment as possible with the central axis of the reed member 251, thereby bringing the reed contacts 253 and 254 into engagement. The substantially U-shaped magnetic assembly provides an extremely concentrated magnetic field for the reed member 251 so as to substantially minimize the number of turns required for the windings 12–17, 202 and 271.

The operation for checking the stop lights is as follows:

Brake switch 70 moves to the closed condition upon depression of the brake pedal establishing a current path from the voltage source 72 through brake switch 70 and diode 273 to conductor 274. Conductor 274 is tied to terminal 97 which is connected to green bulb 99 and red bulb 100 to ground potential. Thus, as soon as brake switch 70 moves to the closed position, the green bulb 99 becomes energized. Brake switch 70 also establishes a current path through lead 59 to winding 16, the opposite terminal of which goes to the stop lights 45 and 46, the opposite terminal of which goes to the stop lights 45 and 46. In addition thereto, a third current path is established through conductor 201 in the same manner as previously described with reference to FIGURE 5, so as to energize winding 202. When the stop lights 45 and 46 are working properly, the winding 16 and 202 set up a net magnetic field of zero, preventing the contacts 253 and 254 from engaging. If one or both of the stop lights 45 or 46 becomes faulty, winding 16 generates fewer ampere turns causing a resultant magnetic field of greater than zero to be established. This causes closure of contacts 253 and 254 to establish a current path through lead 255, the closed contacts 253 and 254, lead 256 and diode 274 to terminal 275, which is connected to resistor 219 and red bulb 100 to ground potential. This bypasses green bulb 99 and causes red lamp 100 to become energized, thus establishing the fact that one or both of the stop lights 45 or 46 has become faulty.

The reed switch 251 has been found to be so sensitive as to have its contacts remain in the engaged state if any magnetic saturation remains in the magnetic assembly even after de-energization of all of the coils 12–17 and 202. In order to provide a coercive force to reduce the saturation of the magnetic assembly, lead 256 is connected to a lead 277 which is connected to one terminal of winding 271, the opposite terminal of which is connected through a resistor 278 to ground potential. Thus, each time the contact pair 253 and 254 closes, a coercive force energized by winding 271 acts to reset the magnetic assembly so as to remove any retentive magnetic orientation from the magnetic assembly. The remainder of the operation of light alarm means 250 of FIGURE 6 is substantially identical to that of FIGURES 1 and 5 and a description thereof will be omitted for purposes of clarity. The basic distinction of the embodiment 250 is the employment of the reed switch element 251 and the magnetic assembly comprised of elements 257, 258, 259, 260 and 261 which provides an extremely high degree of sensitivity thus substantially reducing the number of turns needed for the windings 12–17, 202 and 271. Another way of employing the reed switch 251 of FIGURE 6 without the magnetic assembly provided therein is to provide a tube of an insulating material, such as, for example, cardboard, around the reed switch envelope 253 so that the cardboard extends beyond the extreme left and right-hand ends of the envelope. The windings are then wound about this cardboard tube so as to generate magnetic fields a direction along the longitudinal axis of the reed switch 251. An embodiment of this type would of course not require the coercive winding 271 since no magnetic material is employed in such an assembly.

Figure 7:
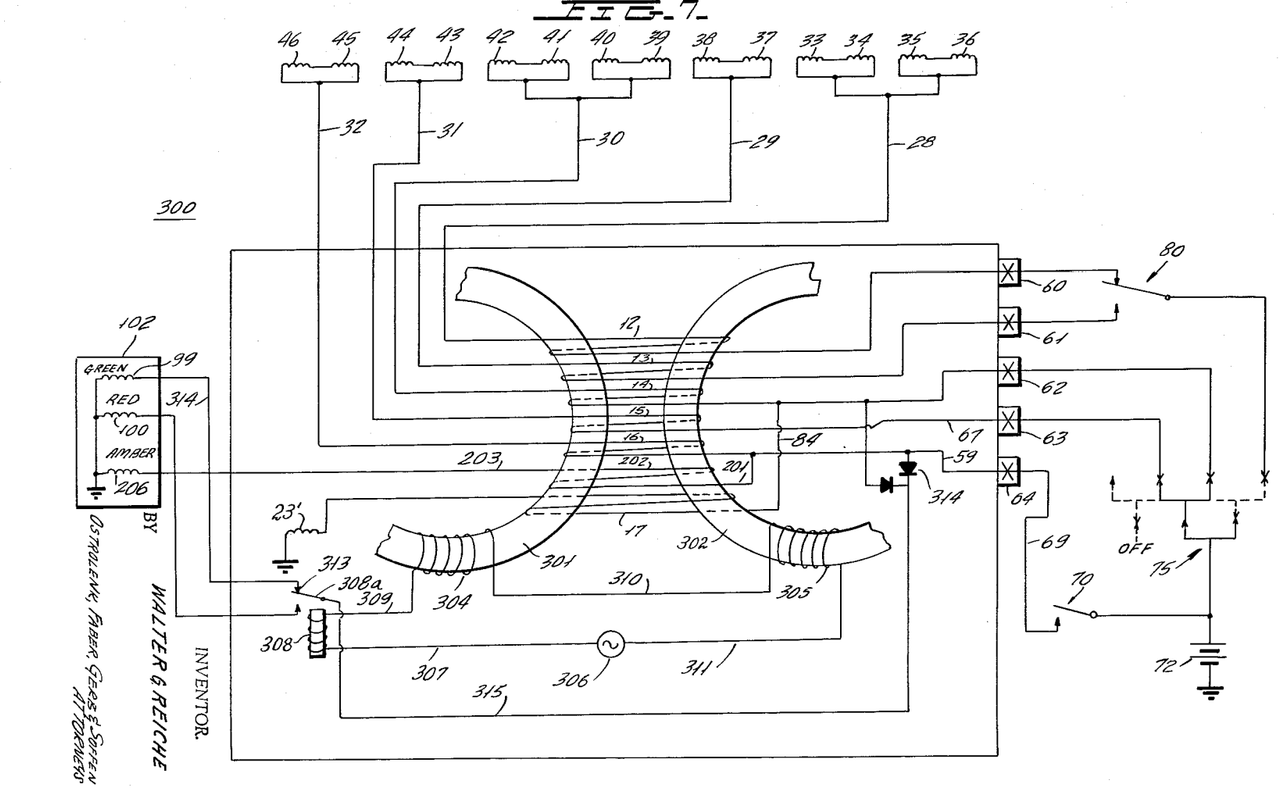

FIGURE 7 shows still another embodiment 300 of the light alarm means. In the embodiment of FIGURE 7, like elements are designated by like numerals relative to the previous figures of the specification, with the exception that a novel toroidal core system comprised of cores 301 and 302 is utilized in the light alarm means 300 of FIGURE 7. While the cores 301 and 302 have been shown to be broken, it should be understood that they are solid continuous rings or cores with the portions being removed having been done for purposes of clarity. In the actual physical picture the cores 301 and 302 are stacked one on top of the other and the windings 12–17 and 202 are then wound about both cores, and substantially the manner is shown in FIGURE 7. Cores 301 and 302 are further provided with windings 304 and 305 respectively, each being individually wound about its associated core. The windings 12–17 and 202 acts as D.-C. windings, operating to change the saturable state of both cores in the same direction, whereas the windings 304 and 305 are so wound as to provide states of reversed saturation as between the cores 301 and 302.

The operation of the embodiment 300 of FIGURE 7 is as follows:

An A.-C. source 306 is provided in the circuit and is connected through conductor 307 to one terminal of a coil 308. The opposite terminal of coil 308 is connected to a conductor 309 to one terminal of coil 304, the other terminal of which is connected to one terminal of coil 305 through conductor 310. The opposite terminal of coil 305 is connected through a conductor 311 to the opposite terminal of the A.-C. source 306. Assuming no energization whatsoever of the windings 12–17 and 202, the A.-C. source 306 acts to continuously reverse the saturable states of cores 301 and 302. These reversal operations cause the cores 304 and 305 to present an extremely high impedance to a A.-C. source 306, so that the current flowing through this closed circuit is insufficient to provide a satisfactory amount of current to cause coil 308 to operate its movable contact 308a. Let it now be assumed that it is desired to check the condition of the stop lights 45 and 46. The brake switch 70 moves to the closed position under control of depression of the brake pedal, establishing a current path from D.-C. source 72, brake switch 70, lead 69, terminal 64 and conductors 59 and 201 to winding 202. The opposite terminal of winding 202 is connected through lead 203 to amber light 206, thus energizing the amber light to indicate the fact that the brake switch 70 is in the closed position. A second current path is established through conductor 59 and diode 314 to conductor 315, movable contact 308, stationary contact 313, and conductor 314, to green bulb 99.

It can be seen that the windings 16 and 202 which are both energized through conductor 59 are wound in the reverse directions, so that their total effect on cores 301 and 302 is such as to produce a net magnetic force of zero magnitude. Thus cores 301 and 302 continue to present a high impedance to the A.-C. source 306 such that the current flowing through the closed loop containing A.-C. source 306 is insufficient to operate the solenoid 308, thus the movable contact 308a remains in engagement with stationary contact 313 so as to retain green bulb 99 in the energized state.

Let it now be assumed that one or both of the stop light bulbs 45 or 46 become inoperative. This causes a decreased magnitude current to flow through winding 16 so that the windings 16 and 202 are no longer in a balanced condition and generate a resultant magnetic flux different from zero magnitude. The resultant magnetic flux is sufficient to cause saturation of both of said cores 301 and 302 is a first direction. This causes one of said cores to present an extremely low impedance to the A.-C. source 306 while the other one presents a high impedance and this situation keeps alternating as the A.-C. source 306 goes through each half cycle. Thus the cumulative impedance which both of said cores present to the A.-C. winding is substantially diminished causing the current flowing through the closed loop containing the A.-C. source 306 to be substantially increased. The current through this closed loop is now sufficient to energize winding 308 sufficiently to draw movable contact 308a downward and into engagement with stationary contact 312. This establishes a current path to red bulb 100, energizing the red bulb to indicate a faulty stop light or faulty stop lights.

In the case where the main switch is operated so that the parking lights, license lights and tail lights 44–43, 42–41, and 40–39 respectively, are energized, this causes windings 15 and 14 to become energized as well as windings 17, which is coupled to conductor 67 through lead 84. Total ampere turns of windings 14 and 15 are counter-balanced by the ampere turns generated by winding 17, so as to generate a net resultant magnetic flux of substantially zero magnitude. This again causes stationary contact 313 to be in engagement with movable contact 308a to light the green bulb. If any of the parking, license or tail lights become de-energized, the windings 14 or 15, respectively associated with these lights have a substantially decreased current flow causing a resultant magnetic field of greater than zero magnitude to be generated. This again drives both cores 301 and 302 into a state of saturation so as to present a substantially low impedance to the A.-C. source 306 causing movable contact 308a under control of energized winding 308 to come into contact with stationary contact 312 to light red bulb 100, thus indicating the fact that at least one of the lights in the parking, license and tail light group has become faulty. It should be understood that the low and high beams under control of both main switch 75 and dimmer switch 80 operate in a manner substantially identical to the arrangement of FIGURE 1 in order to automatically indicate the condition of the low or high beams, depending on which lamps are energized under control of dimmer switch 80.

It can therefore be seen that the instant invention teaches a novel configuration for automatically indicating the condition of all lamps in an automobile or truck lighting systems without the need for personally observing each and every one of the lamps of the system, and also without the need for initiating a test to determine the condition of the lights. This is true since the mere usage of the lights places the light condition indicating means into operation without the need for operating any other button or switch for the purpose of performing such a test. The system is sufficiently sensitive to provide an accurate indication upon the failure of any one lamp in the entire lighting system and does not depend upon a failure of a plurality of lights for its operation. The device may very simply be installed into an automobile or truck by installing the light module 102 in any convenient position in or beneath the dashboard while the differential relay module 54 may be mounted in any convenient position.

It should further be noted that if any of the windings in the light condition responsive system should become short-circuited for any reason, this in no way affects the operativeness of the automobile or truck lighting system. The light condition indicating means requires very little current for operation and develops an extremely small voltage drop during operation thereof. The voltage drop has been found to be of the order of less than ¼ volt. As for installation of the system, no alterations whatsoever need be made to automobiles or trucks for employment of the system, but for the actual contacts between the system and the automobile electrical system.

Although there has been described a preferred embodiment of this novel invention, many variations and modifications will now be apparent to those skilled in the art. Therefore, this invention is to be limited, not by the specific disclosure herein, but only by the appending claims.

What is claimed is:
1. For use in automobiles, trucks and the like, vehicles having a plurality of lamps energized by a power source the improvement being means for indicating the condition of such lamps and being comprised of
   magnetic means;
   a plurality of first windings wound about said magnetic means and connected between an associated lamp and the power source, said first windings having a first magnetic polarity;
   a balance winding wound about said magnetic means being coupled to said power source, said balance winding having a magnetic polarity opposing the polarity of said first windings;
   the resultant magnetic field generated by all of said windings being substantially zero when said lamps are in good operating condition and having a magnitude substantially different from zero when any of said lamps are defective;
   contact means coupled to said power source being positioned in close proximity to said magnetic means and having bias means for biasing said contact means into a first position;
   said contact means being movable to a second position when said resultant magnetic field has a magnitude substantially different from zero;

first bulb means connected to said contact means being energized when said contact means is in said second position;

balancing bulb means connected in series with said balance winding to alter the strength of the magnetic field generated by said balance winding to compensate for changes in the strength of the magnetic fields generated by said first windings due to variations in voltage of said power source.

2. The indicating means of claim 1 further comprising:
second bulb means connected to said contact means being energized when said contact means is in said first position.

3. The indicating means of claim 1 wherein said vehicle is provided with brake lights operative under control of the vehicle brake pedal, said indicating means further comprising:

switch means connectible to the power source operable upon depression of the vehicle brake pedal to close its contacts;

second and third windings of opposite magnetic polarity wound about said magnetic means;

first terminals of said second and third windings connected in common to said switch means;

the remaining terminal of said second winding being connectible to the vehicle brake lights;

third bulb means connected to the remaining terminal of said third winding and being energized whenever said switch means is closed;

the magnitudes of the magnetic fields generated by said second and third windings being substantially equal when said brake lights are in operative condition and being substantially unequal when any of said brake lights are defective.

4. The indicating means of claim 2 wherein said second bulb means having a substantially higher voltage rating than said first bulb means to prevent said first bulb means from becoming energized when said second bulb means is energized; said first bulb means preventing said second bulb means from becoming energized when said contact means is in said first position.

5. For use in automobiles, trucks and the like, vehicles having a plurality of lamps energized by a power source the improvement being means for indicating the condition of such lamps and being comprised of
a reed assembly;
a plurality of first windings wound about said reed assembly and connected between an associated lamp and the power source, said first windings having a first magnetic polarity;
a balance winding wound about said reed assembly being coupled to said power source, said balance winding having a magnetic polarity opposing the polarity of said first windings;
the resultant magnetic field generated by all of said windings being substantially zero when said lamps are in good operating condition and having a magnitude substantially different from zero when any of said lamps are defective;
said reed assembly being connectible to a source of power and being comprised of a glass envelope;
movable first and second contacts in said envelope normally biased toward separation and movable under control of a magnetic field to an engaged position when said magnetic fields are not balanced;
first bulb means coupled to said reed assembly contact assembly being energized when said reed assembly is in said engaged position to indicate proper operation of said lights;

balancing bulb means connected in series with said first balance winding to alter the strength of the magnetic field generated by said balance winding to compensate for changes in the strength of the magnetic fields generated by said first windings due to variations in voltage of said power source.

6. The indicating means of claim 1 wherein said magnetic means is further comprised of a rod-shaped magnetic member threading all of said windings;
first and second cylindrical-shaped magnetic members each having first ends magnetically coupled to said rod-shaped member;
said contact means comprising a reed assembly being inserted through the second ends of said cylindrical shaped members;
said cylindrical shaped members being adjustable relative to the longitudinal axis of said reed assembly.

7. The indicating means of claim 6 further comprising;
means coupled to said reed assembly and connectible to the power source and being wound about said rod-shaped member to desaturate said magnetic means when said reed assembly is in said second position.

8. For use in indicating the condition of lamps in automobiles, trucks and the like vehicles having a plurality of lamps and a power source, the improvement comprising:
first and second saturable magnetic cores;
first and second windings respectively, wound about said first and second cores and being connected in series fashion;
an alternating current source coupled to the remaining terminals of said first and second windings;
a plurality of third windings coupled between an associated vehicle lamp and the power source each being wound in the same direction about both said first and second cores to generate magnetic fields of a first polarity;
a balance winding connected to said power source being wound in the reverse direction about said first and second cores for generating a magnetic field of a reverse polarity counteracting the magnetic fields generated by said plurality of third windings;
relay means connected in series wtih said alternating current source having means normally biasing said relay means to a first position;
the resultant magnetic field generated by said third windings and said balance winding being substantially zero when said lamps are in operating condition and having a magnitude substantially different from zero when any of said lamps are defective;
said relay means energized and movable to a second position when any of said vehicle lamps are defective;
first and second bulb means connected between said relay means and the power source;
said first bulb means being energized and said second bulb means being deenergized when said relay is in said first position; said first bulb means being deenergized and said second bulb means being energized when said relay means is in said second position.

9. The indicating means of claim 8 further comprising;
balancing bulb means connected in series with said balance winding to alter the strength of the magnetic field generated by said balance winding to compensate for changes in the strength of the magnetic fields generated by said first windings due to variations in voltage of said power source.

(References on following page)

References Cited by the Examiner
UNITED STATES PATENTS

| | | | |
|---|---|---|---|
| 1,558,949 | 10/1925 | Thompson et al. | 340—251 |
| 1,938,828 | 12/1933 | Gordon | 315—82 |
| 2,087,029 | 7/1937 | Gordon | 315—130 |
| 2,414,932 | 1/1947 | Crockett | 315—82 |
| 2,743,431 | 4/1956 | Wright | 340—251 X |
| 2,844,814 | 7/1958 | Partl | 317—155.5 X |
| 2,887,616 | 5/1959 | Sendel | 315—83 |
| 3,074,013 | 1/1963 | Bowden | 324—51 |

JOHN W. HUCKERT, *Primary Examiner.*

JAMES D. KALLAM, A. M. LESNIAK,
*Assistant Examiners.*